United States Patent [19]
Oono

[11] Patent Number: 5,713,063
[45] Date of Patent: Jan. 27, 1998

[54] ELECTROSTATIC IMAGE TRANSFER DEVICE HAVING A TWO LEVEL TRANSFER VOLTAGE FOR IMPROVING IMAGE QUALITY AT LEADING AND TRAILING EDGE REGIONS

[75] Inventor: Michiteru Oono, Tokyo, Japan

[73] Assignee: Kabushiki Kaisha Toshiba, Kawasaki, Japan

[21] Appl. No.: 636,669

[22] Filed: Apr. 23, 1996

Related U.S. Application Data

[62] Division of Ser. No. 283,898, Aug. 3, 1994, Pat. No. 5,541,718.

[51] Int. Cl.$^6$ ................................................... G03G 15/16
[52] U.S. Cl. ................................................... 399/66; 399/316
[58] Field of Search ................................ 399/66, 310, 311, 399/316

[56] References Cited

U.S. PATENT DOCUMENTS

| | | | |
|---|---|---|---|
| 3,620,617 | 11/1971 | Kelly et al. | 35/3 |
| 4,183,653 | 1/1980 | Satomi et al. | 355/3 |
| 4,338,017 | 7/1982 | Nishikawa | 355/3 |
| 4,478,506 | 10/1984 | Miyoshi et al. | 355/3 |
| 4,882,606 | 11/1989 | Deguchi | 355/274 |
| 4,896,192 | 1/1990 | Kinoshita | 355/271 X |
| 5,130,752 | 7/1992 | Morishita et al. | 355/274 |
| 5,138,396 | 8/1992 | Satou et al. | 355/271 X |
| 5,144,383 | 9/1992 | Murano et al. | 355/274 |
| 5,200,784 | 4/1993 | Kimura et al. | 355/274 |
| 5,225,879 | 7/1993 | Hayashida | 355/274 |

FOREIGN PATENT DOCUMENTS 57-210375  12/1982  Japan.

*Primary Examiner*—R. L. Moses
*Attorney, Agent, or Firm*—Foley & Lardner

[57] ABSTRACT

An image-transfer device for transferring an image from an image-bearing member to a sheet-like material by an electrostatic force, having a charging member for charging the sheet-like material so that the image on the image-bearing member is transferred onto the sheet-like material. A transporting mechanism is also provided for transporting the sheet-like material through a transfer region between the charging member and the image-bearing member, the transporting mechanism including a guide member for guiding the sheet-like material, the guide member having a first edge portion arranged at an upstream side of the transfer region and a second edge portion arranged at a downstream side of the transfer region so as to form an opening at the transfer region. A first voltage source applies a first transfer voltage and a second transfer voltage to the charging member wherein the second transfer voltage is a lower voltage than the first transfer voltage. A first switch sets the first transfer voltage as the output of the first voltage source when the sheet-like material is guided by both of the first edge portion and the second edge portion, and sets the second transfer voltage as the output of the first voltage source when either the first guide portion or the second guide portion does not guide the sheet-like material.

13 Claims, 8 Drawing Sheets

ELECTROSTATIC IMAGE TRANSFER DEVICE HAVING A TWO LEVEL TRANSFER VOLTAGE FOR IMPROVING IMAGE QUALITY AT LEADING AND TRAILING EDGE REGIONS

This application is a division of application Ser. No. 08/283,898, filed Aug. 3, 1994, U.S. Pat. No. 5,541,718.

BACKGROUND OF THE INVENTION

1. Field of the Invention

The present invention relates to an image forming apparatus and, more specifically, to an image-transfer device capable of faithfully transferring an image from an image-bearing member to a sheet-like material.

2. Description of the Related Art

An image-transfer device in an image forming apparatus such as an electrophotographic copying apparatus and an electrostatic recording apparatus, as, for example, disclosed in U.S. Pat. No. 5,225,879, has a transfer charger which is a DC corona discharger and a separation charger which is an AC corona discharger. The transfer charger and the separation charger are arranged to be separated from a photoconductive drum which constitutes the image-bearing member. The transfer charger discharges a back surface of a paper sheet via the DC corona to electrostatically transfer a toner image from the photoconductive drum to the paper sheet. Then, the separation charger discharges the paper sheet via the AC corona to electrostatically separate the paper sheet with the toner image, from the photoconductive drum.

In a conventional image-transfer device having the above structure, each output level of the transfer charger and the separation charger is controlled to be constant during the transfer and the separation operations.

However, even if these output levels are controlled to be constant, the toner image transferred onto the sheet paper is not of uniform quality. The toner is somewhat spotty especially in the region of the leading end portion and the trailing end portion of the paper sheet.

SUMMARY OF THE INVENTION

The object of the invention is to provide an image forming apparatus with an image-transfer device capable of transferring an image from an image-bearing member to a sheet-like material with high fidelity.

In accordance with the present invention, the foregoing object, among others, are achieved by providing an image-transfer device for transferring an image from an image-bearing member to a sheet-like material by an electrostatic force. The image transfer device has a charging member for charging the sheet-like material so that the image on the image-bearing member is transferred onto the sheet-like material, a transporting mechanism for transporting the sheet-like material through a transfer region between the charging member and the image-bearing member, a first voltage source for applying a first transfer voltage and a second transfer voltage to the charging member, the second transfer voltage being a lower voltage than the first transfer voltage, and a first switch. The transporting mechanism includes a guide member for guiding the sheet-like material, the guide member having a first edge portion arranged at an upstream side of the transfer region and a second edge portion arranged at a downstream side of the transfer region so as to form an opening at the transfer region. The first switch sets the first voltage source to apply the first transfer voltage when the sheet-like material is guided by both of the first edge portion and the second edge portion, and the second transfer voltage when either the first guide portion or the second guide portion does not guide the sheet-like material.

Furthermore, in accordance with the present invention, the foregoing object, among others, are achieved by providing an image-transfer device for transferring an image from an image-bearing member to a sheet-like material by an electrostatic force. The image transfer device has a charging member for charging the sheet-like material so that the image on the image-bearing member is transferred onto the sheet-like material via an electrostatic force, a transporting mechanism for transporting the sheet-like material through a transfer region between the charging member and the image-bearing member, a separating member mounted downstream of the charging member, for removing the electrostatic force by the charge in order to separate the sheet-like material with the image from the image-bearing member, a second voltage source for applying a first separation voltage and a second separation voltage to the separating member, the second separation voltage being a lower voltage than the first separation voltage, and a second switch which sets the second voltage source to the first separation voltage when the trailing end portion of the sheet-like material between the separating member and the image-bearing member is not within the transfer region, and to the second separation voltage when the trailing end portion is within the transfer region.

BRIEF DESCRIPTION OF THE DRAWINGS

A more complete appreciation of the present invention and many of the attendant advantages thereof will be readily obtained as the invention becomes better understood by reference to the following detailed description, when considered in connection with the accompanying drawings, wherein.

DETAILED DESCRIPTION OF THE PREFERRED EMBODIMENT

Figure 1:
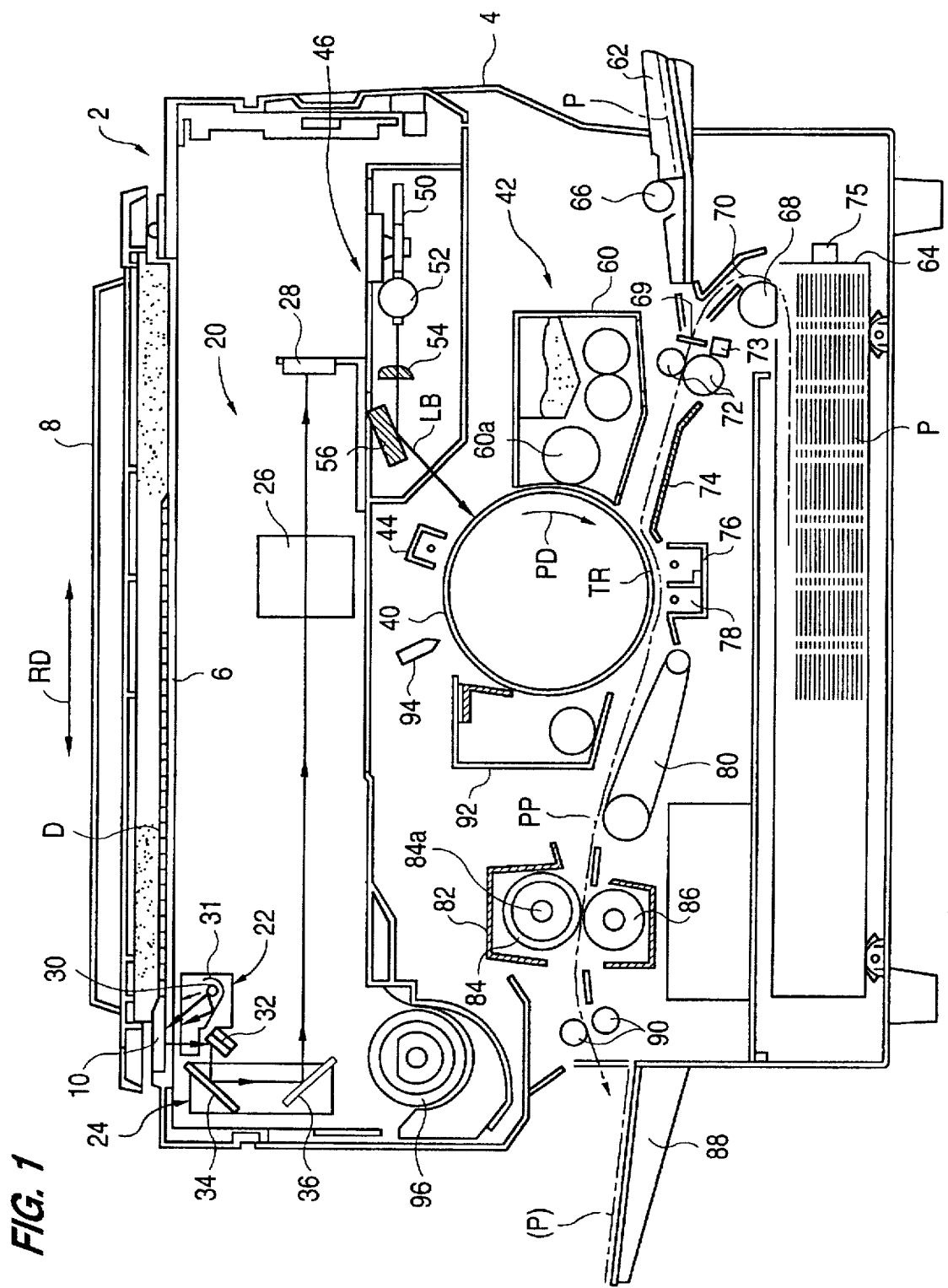
FIG. 1 is a sectional view showing the arrangement of a copying machine.

FIG. 1 shows a copying machine 2 as an image-forming apparatus according to an embodiment of the present invention. Copying machine 2 includes a copying machine housing 4. A platen 6, which is a transparent glass, is fixed on the upper surface of housing 4. A platen cover 8 is arranged to removably cover platen 6. A scale 10 for indicating a position to be placed, and positioning an original D fixed at one end of platen 6 along the longitudinal direction thereof.

Original D placed on platen 6 is scanned for image exposure by an image-reading system 20. Image-reading system 20 includes a first carriage 22, a second carriage 24 and a lens block 26 for focusing the light from original D (either unmagnified, magnified or reduced) onto a CCD sensor 28. First carriage 22 includes an exposure lamp 30, a reflector 31 for reflecting the light from exposure lamp 30 to platen 6, and a mirror 32. Second carriage includes a mirror 34 and a mirror 36. First carriage 22 and second carriage 24 are moved by a pulse motor (not shown), through a driving belt and some gears (not shown). Therefore, when image-reading system 20 scans original D, original D is exposed by exposure lamp 30 while first carriage 22 and second carriage 24 reciprocate in the direction indicated by an arrow RD along the under surface of platen 6. In this case, second carriage 24 moves at a speed half that of first carriage 22 in order to maintain a fixed optical path length.

A reflected light beam from original D scanned by image-reading system 20 is reflected by mirror 32, mirror 34 and mirror 36, transmitted through lens block 26 and then directed to CCD sensor 28. CCD sensor 28 outputs electric signals corresponding to the reflected light beam indicating the original image of original D.

A photosensitive drum 40 is surrounded by an image forming unit 42. Photosensitive drum 40 is rotated by a motor (not shown) in the direction indicated by an arrow PD so that its surface is wholly charged first by a main charger 44 so that a potential of the circumferential surface is about −750 V. A laser beam LB is projected on the charged surface of photosensitive drum 40 by a laser unit 46, forming the electrostatic latent image. Laser unit 46 includes semiconductor laser oscillator (not shown) for generating laser beam LB modulated in accordance with dot image data on the basis of the electric signal output from CCD sensor 28. Also, laser unit 46 includes a collimator lens (not shown) for focusing laser beam LB emitted from the laser oscillator so that a cross-sectional shape of the laser beam LB is circular, a polygon mirror 50 for scanning laser beam LB focused by the collimator lens, a mirror motor 52 for rotating polygon mirror 50 at a high speed, an fθ lens 54 to unify the focussing of the laser beam LB from the polygon mirror 50 in the scanning direction, and a mirror 56 for reflecting laser beam LB so that laser beam LB is radiated onto photosensitive drum 40.

The electrostatic latent image is developed into a visible image which is a toner image by a developing roller 60a of a developing unit 60 using two component developing agents. A bias voltage of the developing unit 60 is about −500 V. Paper sheets P as an image record media are delivered one by one from a paper tray 62 or a paper cassette 64 by paper-supply roller 66 or paper-supply roller 68, respectively, and guided along a paper guide path 69 or a paper guide path 70, respectively, to an aligning roller pair 72. Paper sheet P is detected by an aligning switch 73 just upstream of aligning roller pair 72 in the transportation direction of paper sheet P. Then, each paper sheet P is delivered to a transfer region TR by aligning roller pair 72 and a guide 74, timed to the formation of the visible image on drum 40.

Paper cassette 64 is removably attached to the bottom portion of housing 4. Paper cassette 64 and paper tray 62 can be alternatively selected by the operator using a control panel (not shown). Paper cassette 64 is provided, with cassette size detecting switches 75 (only one shown) which detect the size of paper sheet P contained in paper cassette 64. Detecting switches 75 are each formed by a plurality of microswitches which are turned on or off in response to insertion of cassettes which have different sizes of paper sheet P.

Paper sheet P delivered to transfer region TR comes into intimate contact with the surface of photosensitive drum 40, in the space between a transfer charger 76 which is a DC corona discharger and photosensitive drum 40. As a result, the toner image on photosensitive drum 40 is transferred to paper sheet P by the agency of transfer charger 76. After the transfer, paper sheet P is separated from photosensitive drum 40 by a separation charger 78 which is a vibratory (AC+DC) corona discharger and transported by a conveyor belt 80. Separation charger 78 removes the electrostatic force supplied between photosensitive drum 40 and paper sheet P in order to separate the paper sheet from photosensitive drum 40. Thereafter, paper sheet P is delivered to a fixing unit 82 arranged at the terminal end portion of conveyor belt 80 along a paper path PP. Fixing unit 82 includes a heat roller 84 which has a heater lamp 84a and a pressure roller 86 which is arranged in contact with heat roller 84. As paper sheet P passes a nip portion between heat roller 84 and pressure 86, the transferred image is fixed on paper sheet P. After the fixation, paper sheet P is discharged into a tray 88 outside housing 4 by exit roller pair 90.

After the transfer, moreover, the residual toner on the surface of photosensitive drum 40 is removed by a cleaner 92. Thereafter, a residual latent image on photosensitive drum 40 is erased by a discharge lamp 94 to restore the initial state. A cooling fan 96 for preventing the temperature outside housing 4 from rising is arranged at an upper-left portion of fixing unit 82.

The construction of transfer charger 76 and separation charger 78 will now be described in detail.

Figure 2:
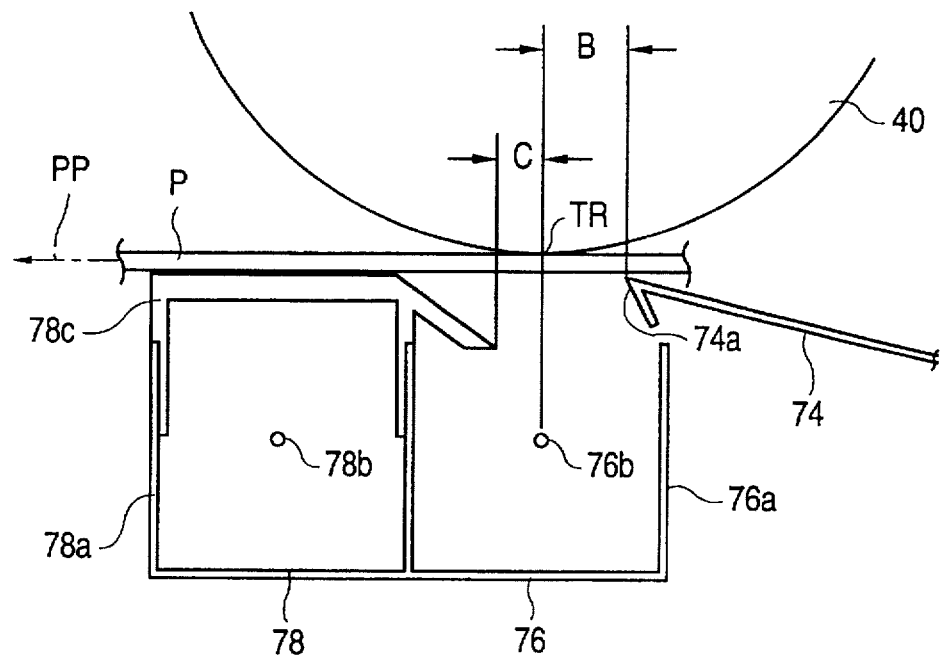
FIG. 2 is an enlarged view of a portion of the sectional view of FIG. 1.

As shown in FIG. 2, transfer charger 76 has a shield case 76a having an opening opposing photosensitive drum 40, and a wire 76b which is a corona discharging electrode, extending in shield case 76a to be parallel to an axis of rotation of photosensitive drum 40. Separation charger 78 has a shield case 78a having an opening opposing photosensitive drum 40, and a wire 78b which is a corona discharging electrode, extending in the shield case 78a to be parallel to the axis of rotation of photosensitive drum 40. Shield case 78a is formed integrally with shield case 76a of transfer charger 76.

Figure 3:
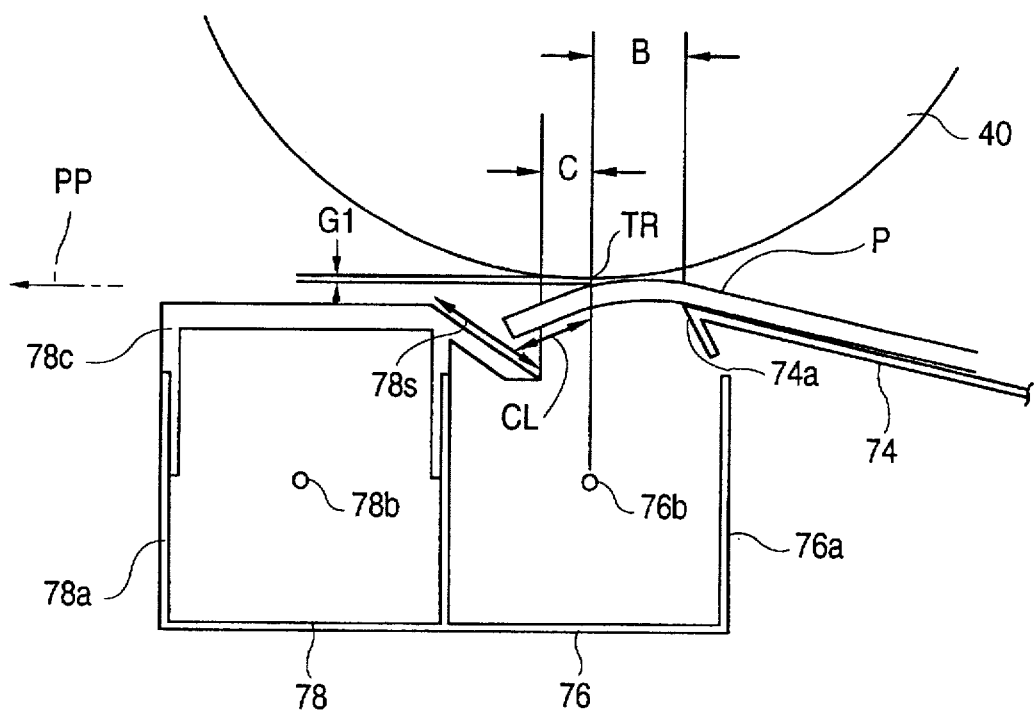
FIG. 3 is an enlarged view of a portion of the sectional view of FIG. 1 right before a leading edge of a paper sheet reaches a conveying guide.

A convey guide 78c is arranged at the opening of separation charger 78. Convey guide 78c guides paper sheet P toward conveyor belt 80 in order to prevent paper sheet P from entering shield case 78a. Convey guide 78c has a plurality of guide plates. These guide plates are arranged at predetermined intervals in the axial direction of photosensitive drum 40 in a manner similar to that as shown in FIG. 3 of U.S. Pat. No. 5,225,879.

An extending end 74a of guide 74 is located above an outer side wall of shield case 76a.

Thus, aligning roller pair 72, guide 74, convey guide 78c and conveyor belt 80 transport paper sheet P through the transfer region TR. The surface of paper sheet P adheres to the surface of photosensitive drum 40 when both of extending end 74a and convey guide 78c support paper sheet P as shown in FIG. 2.

Figure 4:
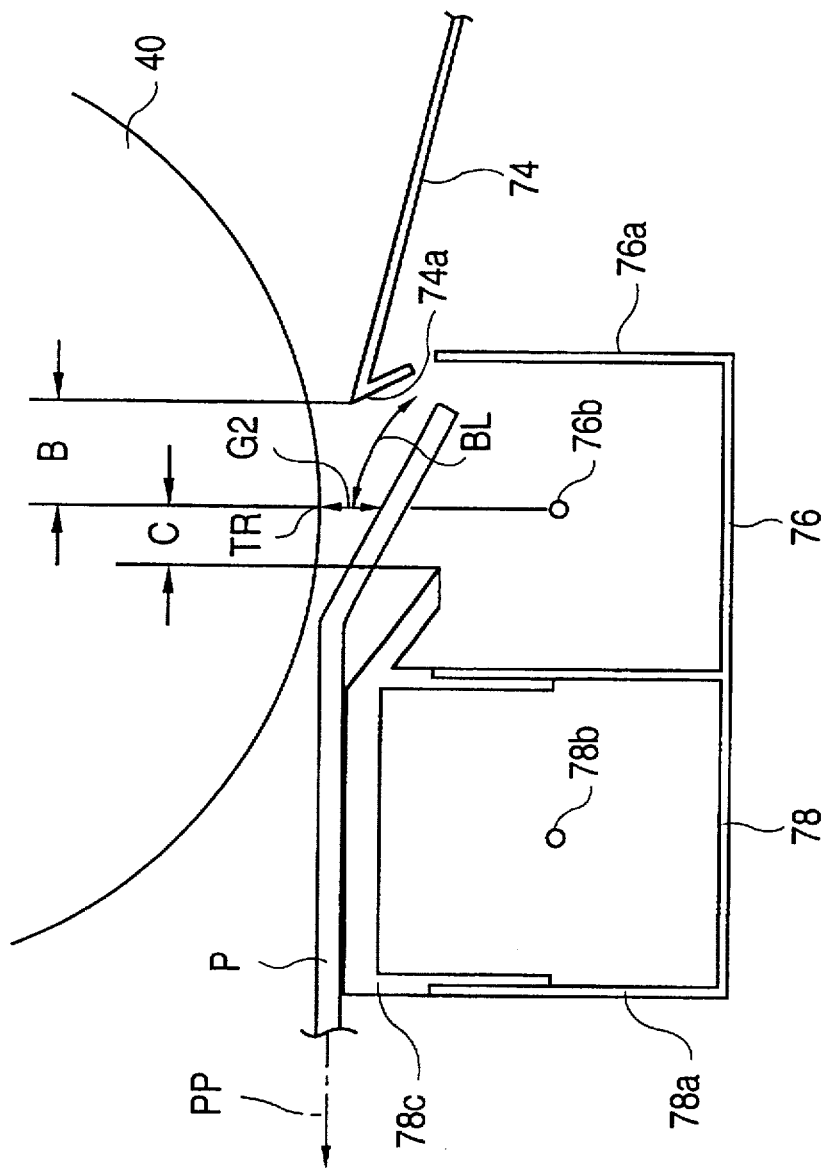
FIG. 4 is an enlarged view of a portion of the sectional view of FIG. 1 right after the following edge of the paper sheet leaves the guide.

As shown in FIG. 3, there is a gap B between extending end 74a and transfer region TR and a gap C between transfer region TR and the end of convey guide 78C. It is important that there be nothing at transfer region TR between photosensitive drum 40 and wire 76b in order to produce a good quality transferred image. It may thus be seen that the existence of gap B and gap C presents a problem in the quality of the transferred image at the leading and trailing edges of the paper sheet P. When extending end 74a supports paper sheet P and convey guide 78c does not support it, or a sloped portion 78s of convey guide 78c supports it, a gap G1 is produced at transfer region TR by the weight of the leading end portion of paper sheet P. In this case, the transferred image is not very good at the interval of a length CL corresponding to gap C and sloped portion 78s from the leading edge of paper sheet P. In the opposite direction, as seen in FIG. 4, when convey guide 78c supports paper sheet P and extending end 74a does not support it, a gap G2 is produced at transfer region TR by the weight of the trailing end portion of paper sheet P. In this case, the transferred image is not very good at the interval of a length BL corresponding to gap B from the trailing edge of paper sheet P.

The existence of gap G1 and gap G2 indicates that paper sheet P approaches transfer charger 76. The more paper sheet P approaches transfer charger 76, the more strongly the transferred image on paper sheet P is affected by the corona discharger from transfer charger 76 and the transferred image vibrates. The vibration causes the transfer performance of transfer charger 76 to get worse and the image comes out spotty or non-uniform.

A correlation between the transfer performance and the output level of transfer charger 76 will be described in detail.

The output level of transfer charger 76 is set as follows. First, an experimental drum made from aluminum is arranged in copying machine 2 instead of photosensitive drum 40. Next, transfer charger 76 is energized and a current flowing in the experimental drum is measured. After that, the output level of transfer charger 76 is adjusted to a level corresponding to the current between 4 µA/50 mm and 20 µA/50 mm. The experimental drum is then removed from copying machine 2 and photosensitive drum 40 is arranged in it. Finally, the copying operation is performed and the transfer performance onto paper sheet P is checked. This test is repeated many times while the output level of transfer charger 76 is changed.

Figure 5:
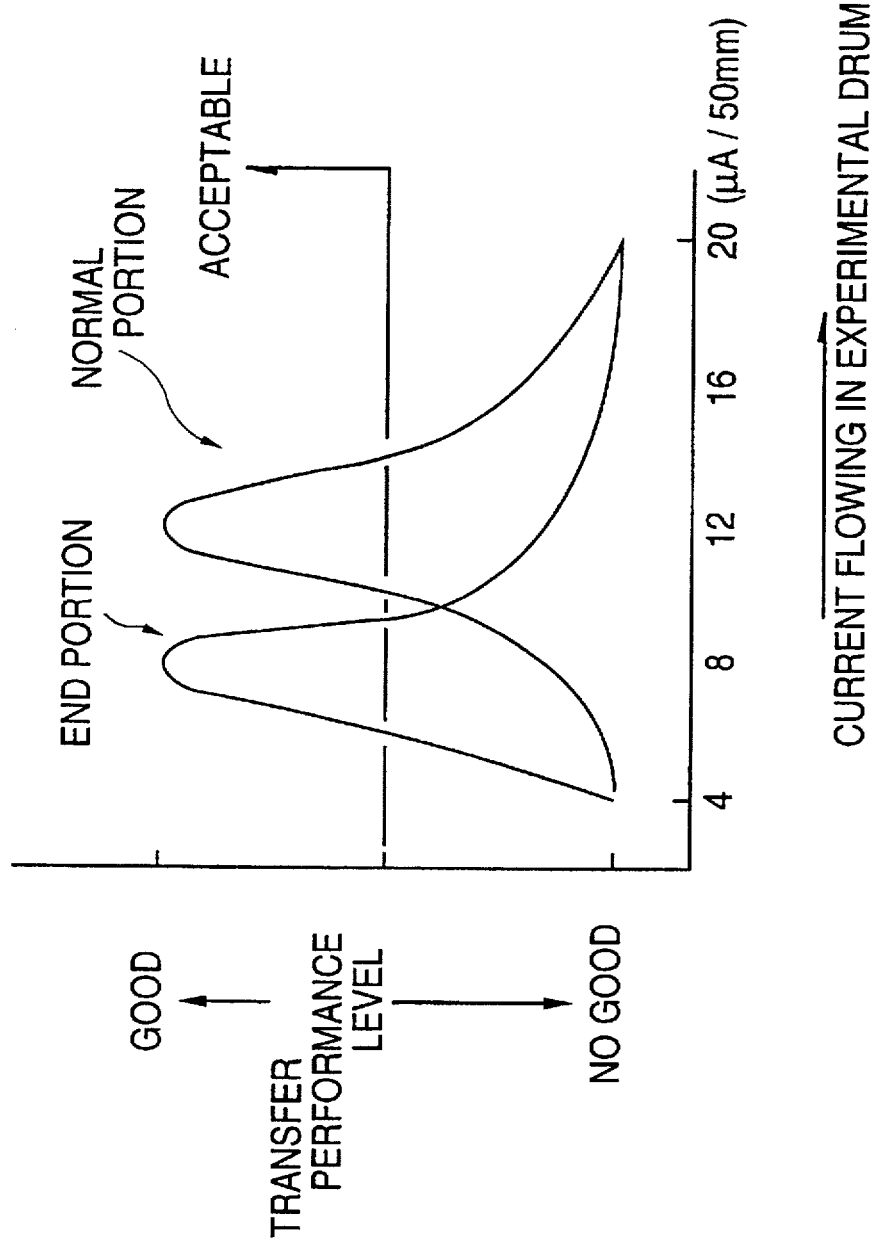
FIG. 5 shows a relationship between transfer performance and current flowing in an experimental drum.

The result of this test is shown in FIG. 5. The horizontal axis represents the current to which the output level of transfer charger 76 corresponds. The vertical axis represents the transfer performance level. According to FIG. 5, the acceptable range for an end portion of paper sheet P which corresponds to the interval of length BL and length CL is different than that for abnormal portion which is at transfer region TR when both of extending end 74a and convey guide 78c support paper sheet P. Especially, if the humidity is low, then the acceptable range of the end portion shifts to a lower level, and the difference between the acceptable ranges of the end portion and the normal portion is larger. It is noted that the response for the leading and trailing edges is substantially the same and shown as a single curve in FIG. 5.

Figure 6:
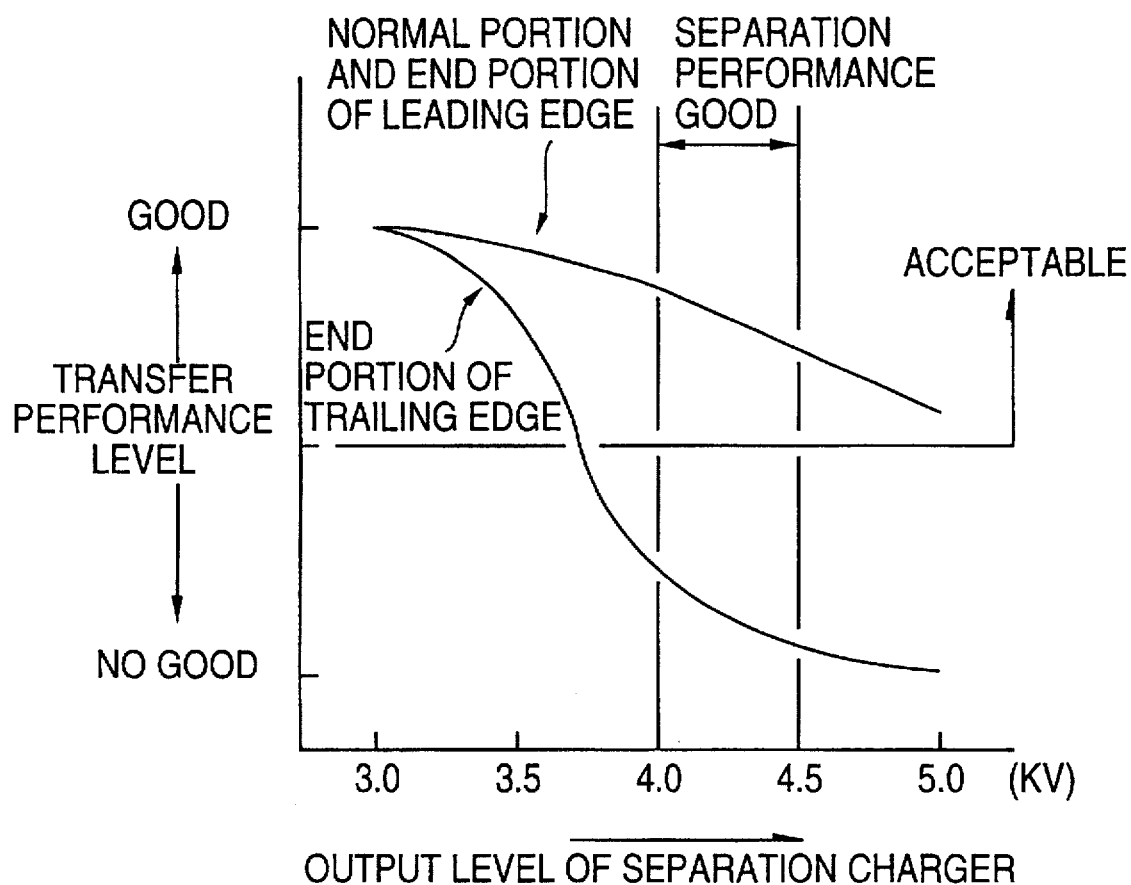
FIG. 6 shows a relationship between transfer performance and output level of a separation charger.

In the meantime, the transfer performance level is affected by not only the output level of transfer charger 76 but also the output level of separation charger 78. As shown in FIG. 6, when the output level of separation charger 78 is from 4.0 kV to 4.5 kV, the separation performance is good. Thus, the output level of separation charger 78 is set at about 4.0 kV~4.5 kV. However, the transfer performance for the end portion of the trailing edge is not good when the output level of separation charger 78 is set as above. Especially, the higher the humidity is, the more the transfer performance is affected by the vibratory (AC+DC) corona charge from separation charger 78. This is because, when the humidity is high, the resistance of paper sheet P is low. Thus, at that time, the AC corona charge discharges the DC corona charge at transfer region TR through paper sheet P.

In this embodiment, the output levels of transfer charger 76 and separation charger 78 are changed from a first level to a second level when the end portions of paper sheet P are in the vicinity of the transfer region. In this manner, the image transferred to the leading and trailing edges of the paper sheet P may also be of high quality. It is within the principles of the invention to provide for lowering the transfer voltage when either the leading or trailing end of the paper sheet are in the transfer region. The second, lower, transfer voltage is effective for transferring the image from the drum 40 to the paper sheet. P when the paper sheet P is not in physical contact with the drum 40. The second, lower, separation voltage is effective for removing the paper sheet P from the drum 40 without adversely effecting the toner image transferred onto the trailing edge portions of the paper sheet P.

A control system for changing the output level is described in detail below.

Figure 7:
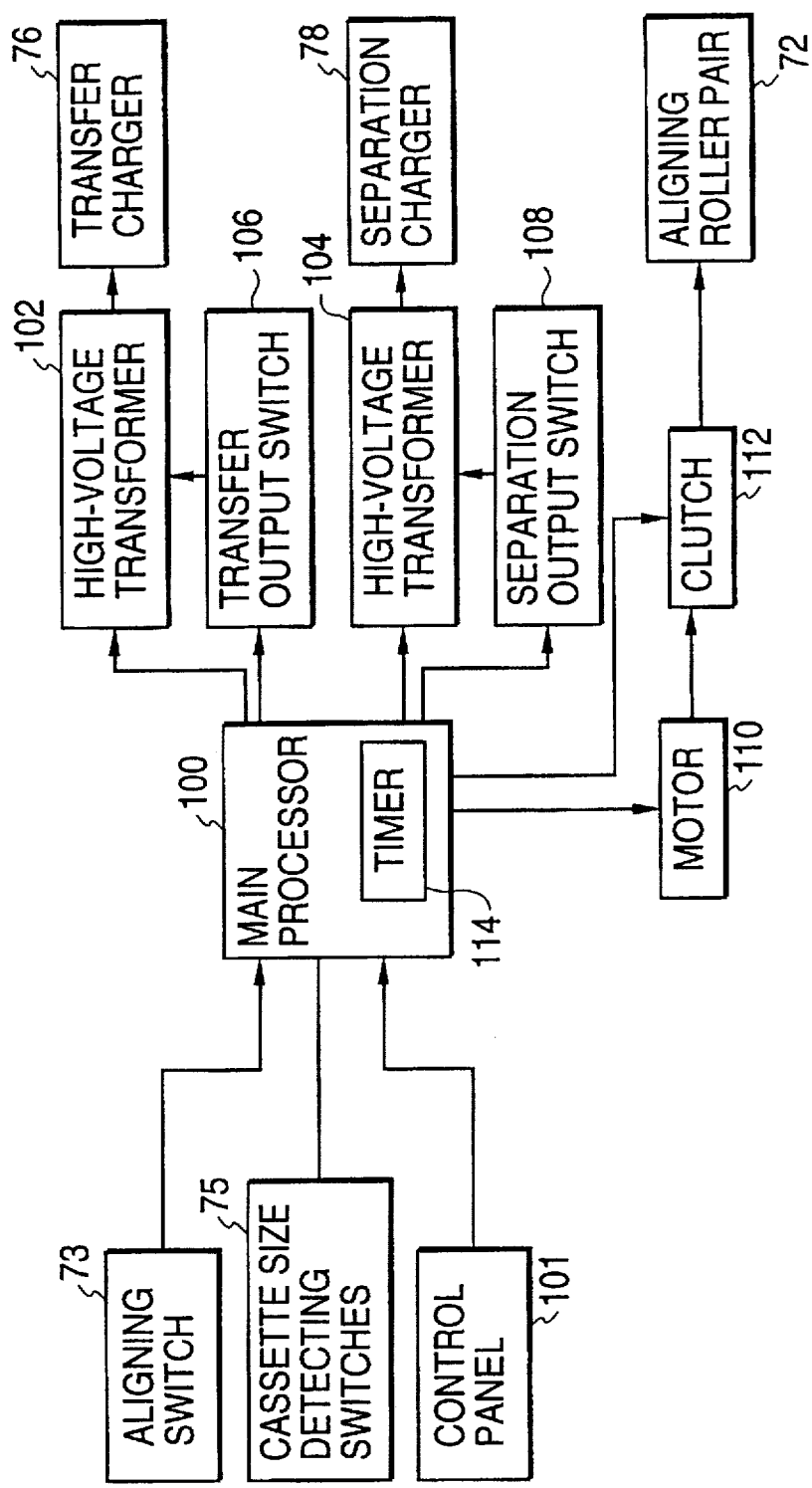
FIG. 7 is a block diagram showing the arrangement of the main part of a control system of the copying machine.

As shown in FIG. 7, the control system has a main processor 100. Main processor 100 receives the detection signal from aligning switch 73 and cassette size detecting switches 75, and a signal from a control panel 101 including a copy key. Also, main processor 100 controls a high-voltage transformer 102 connected to transfer charger 76, a high-voltage transformer 104 connected to separation charger 78, a transfer output switch 106 which changes the output voltage of high-voltage transformer 102 between a high level and a low level, a separation output switch 108 which changes the output voltage of high-voltage transformer 104 between a high level and a low level, a motor 110 for driving a plurality of elements including paper-supply roller 68 and aligning roller pair 72, and a clutch 112 for intermittently transmitting the driving force from motor 110. High voltage transformer 102 applies a DC voltage to wire 76a of transfer charger 76. High-voltage transformer applies an oscillatory voltage provided by superimposing an AC voltage and a DC voltage to wire 78a of separation charger 78. Main processor 100 includes a timer 114.

A controlling operation of this controlling system will now be described in reference to FIGS. 8 and 9.

When an operator selects paper cassette 64 and depresses the copy key on control panel 101, copying machine 2 starts the copying operation. Main processor 100 drives motor 110 and energizes high-voltage transformer 104 and separation output switch 108 so that high-voltage transformer 104 applies the oscillatory voltage which superimposes the high level AC voltage (4.5 kV) and the high level DC voltage (−200 V), to wire 78a as shown in FIG. 8. Main processor 100 determines a time period Z for which aligning roller pair 72 and conveyer belt 80 take to pass paper sheet P through transfer region TR. At that time, paper-supply roller 68 starts to rotate by the driving force from motor 110, and transports paper sheet P to aligning roller pair 72. When aligning switch 73 detects paper sheet P, timer 114 starts to operate in order to detect that a predetermined period (0.2 sec.) elapses. This predetermined time period is a period for which aligning roller pair 72 aligns the leading edge of paper sheet P.

When the predetermined time period has elapsed, a main processor 100 engages clutch 112 so that aligning roller pair 72 rotates. When timer 114 detects that a time period A elapses, a main processor 100 energizes high-voltage transformer 102 and transfer output switch 106 so that high-voltage transformer 102 applies the low level DC voltage (8 μA in FIG. 5) to wire 76a. Time period A is a time period for which aligning roller pair 72 takes to transport the leading edge of paper sheet P from aligning roller pair 72 to transfer region TR, and is substantially constant irrespective of the size of paper sheet P.

When timer 114 detects that a time period CC elapses, main processor 100 energizes transfer output switch 106 so that high-voltage transformer 102 applies the high level DC voltage (12 μA in FIG. 5) to wire 76a. Time period CC is a time period for which the leading edge of paper sheet P takes to pass gap C and sloped portion 78s.

Transfer charger 76 discharges the DC corona charge during the time period Z. A time period B shown in FIG. 8 is a time period for which the trailing edge of paper sheet P takes to pass gap B. Main processor 100 subtracts time period CC and time period B from the time period Z, and determines time period ZS which is the result of the subtraction.

When timer 114 detects the time period ZS has elapsed, main processor 100 energizes transfer output switch 106 so that high-voltage transformer 102 applies the low level DC voltage to wire 76a, and energizes separation output switch 108 so that high-voltage transformer 104 applies the oscillatory voltage which superimposes the low level AC voltage (3 kV) and the low level DC voltage of (0 V) to wire 78a.

When timer 114 detects that time period B has elapsed, main processor 100 turns off high-voltage transformer 102, and energizes separation output switch 108 so that high-voltage transmitter 104 applies the oscillatory voltage which superimposes the high level AC voltage and the high level DC voltage to wire 78a. After that, if another paper sheet P is transported, main processor 100 repeats the same operation.

If the operator selects paper tray 62 at a paper sheet supply unit, the copying operation of copying machine 2 is as follows.

Figure 8:
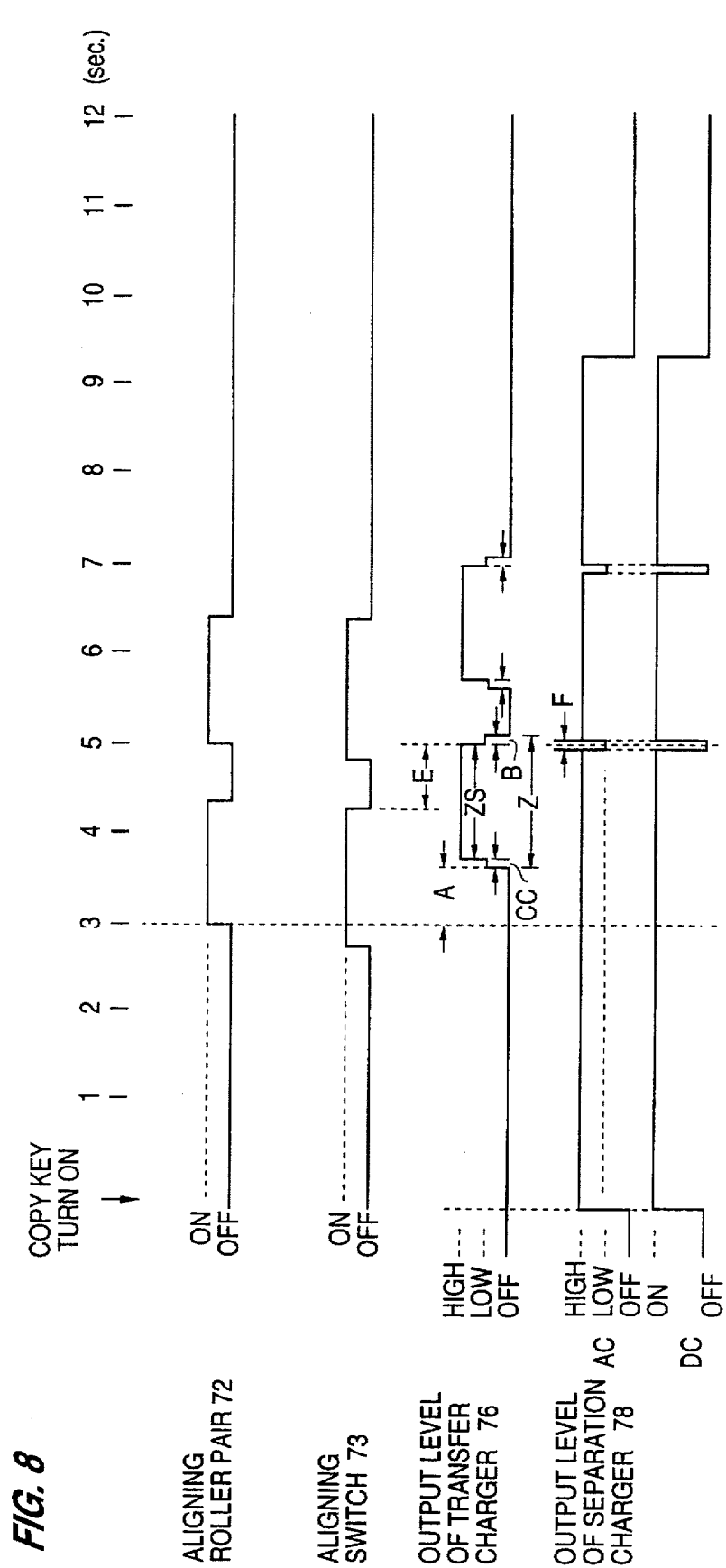
FIG. 8 is a timing chart explaining the operation of the circuit.
Figure 9:
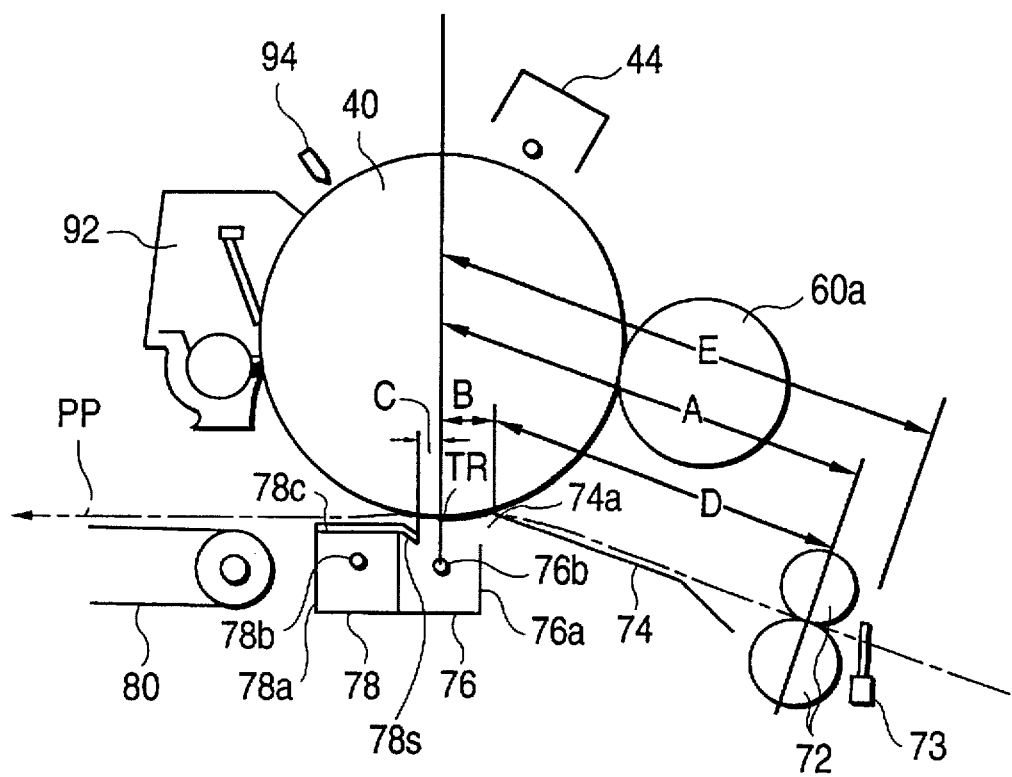
FIG. 9 is an enlarged view of a portion of the sectional view of FIG. 1 for use in better understanding the timing chart of FIG. 8.

Main processor 100 drives motor 110 and energizes high-voltage transformer 104 and separation output switch 108 so that high-voltage transformer 104 applies the oscillatory voltage which superimposes a high level AC voltage and a high level DC voltage (−200V), to wire 78a as shown in FIG. 8. Paper supply roller 68 starts to rotate by the driving force from motor 110, and transports paper sheet P to aligning roller pair 72. When aligning switch 73 detects paper sheet P, timer 114 starts to operate in order to detect that the predetermined time period.

When the predetermined time period has elapsed, main processor 100 engages clutch 112 so that alignment roller pair 72 rotates. When timer 114 detects that the time period A elapses, main processor 100 energizes high-voltage transformer 102 and transfer output switch 106 so that high-voltage transformer 102 applies a low level DC voltage (8 μA in FIG. 5) to wire 76a.

When timer 114 detects that a time period CC elapses, main processor 100 energizes transfer output switch 106 so that high-voltage transformer 102 applies the high level DC voltage to wire 76a.

When timer 114 detects that a time period E elapses, main processor 100 energizes transfer output switch 106 so that high-voltage transformer 102 applies the low voltage DC voltage to wire 76a, and energizes separation output switch 108 so that high-voltage transformer 104 applies the oscillatory voltage which superimposes the low level AC voltage and the low level DC voltage to wire 78a. Time period E is a substantially constant time period after aligning switch 73 turns off. The end of time period E corresponds to the end of time period ZS.

When timer 114 detects that time period B elapses, main processor 100 turns off high-voltage transformer 102, and energizes separation output switch 108 so that high-voltage transformer 104 applies the oscillatory voltage which superimposes the high level AC voltage and the high level DC voltage to wire 78a. After that, if another paper sheet P is transported, main processor 100 repeats the same operation.

The present invention may be also adapted for a non-contact type developing device which is arranged so that the developing roller is not in contact with the photosensitive drum.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An image-transfer device for transferring an image from an image-bearing member to a sheet-like material, comprising:

means, responsive to a transfer voltage and spacedly positioned from the image-bearing member, for charging the sheet-like material in a predetermined polarity so that the image on the image-bearing member is transferred onto the sheet-like material;

means for transporting the sheet-like material through a transfer region between the charging means and the image-bearing member, the transporting means including a guide member for guiding the sheet-like material, the guide member having a first edge portion arranged at an upstream side of the transfer region and a second edge portion arranged at a downstream side of the transfer region so as to form an opening at the transfer region and between the first edge portion and the second edge portion;

means for selectively applying one of a first transfer voltage and a second transfer voltage to the charging means, the second transfer voltage having a lower absolute value than the first transfer voltage, wherein the first transfer voltage is a voltage level effective for transferring the image from the image-bearing member to the sheet-like material which is in contact with the image-bearing member, and the second transfer voltage is a voltage level effective for transferring the image to the sheet-like material which is not in contact with the image-bearing member; and means for setting the applying means to apply the first transfer voltage when the sheet-like material is guided by both the first edge portion and the second edge portion, and setting the applying means to apply the second transfer voltage when only one of the first edge portion and the second edge portion guides the sheet-like material, so that a transfer performance level remains good irrespective of a part of the sheet-like material.

2. An image-transfer device for transferring an image from an image-bearing member to a sheet-like material by an electrostatic force, comprising:

means for charging the sheet-like material in a predetermined polarity so that the image on the image-bearing member is transferred onto the sheet-like material;

means for transporting the sheet-like material through a transfer region between the charging means and the image-bearing member;

means, mounted facing the image-bearing member at a downstream side of the charging means in the transporting direction, for removing the electrostatic force by the charge in order to separate the sheet-like material with the image from the image-bearing member;

means for selectively applying one of a first separation voltage and a second separation voltage to the removing means, the second separation voltage having a lower absolute value than the first separation voltage; and means for setting the applying means to apply the first separation voltage when a part of the sheet-like material is between the removing means and the image-bearing member and the trailing end portion of the sheet-like material is not in the transfer region, and to apply the second separation voltage when a part of the sheet-like material is between the removing means and the image-bearing member and the trailing end portion of the sheet-like material is in the transfer region, so that a transfer performance level remains good irrespective of humidity.

3. The image-transfer device according to claim 2, further comprising means, arranged within a transporting path of the sheet-like material, for detecting the passing of the sheet-like material, wherein the setting means includes means for determining the timing at which the first separation voltage and the second separation voltage are set.

4. The image-transfer device according to claim 2, wherein the first separation voltage is a voltage level effective for separating the sheet-like material, and the second separation voltage is a voltage level which does not prevent transferring the image onto the trailing end portion.

5. The image-transfer device according to claim 2, wherein the transporting means includes a guide member for guiding the sheet-like material, the guide member having a first edge portion arranged at an upstream side of the transfer region and a second edge portion arranged at a downstream side of the transfer region so as to form an opening at the transfer region and between the first edge portion and the second edge portion, and the charging means includes second applying means for applying a first transfer voltage and a second transfer voltage to the charging means, the second transfer voltage being a lower voltage than the first transfer voltage and includes second setting means for setting the second applying means to apply the first transfer voltage when the sheet-like material is guided by both the first edge portion and the second edge portion, and setting the second applying means to apply the second transfer voltage when at least one of the first edge portion and the second edge portion does not guide the sheet-like material.

6. The image-transfer device according to claim 5, wherein the second setting means includes means for selecting the second transfer voltage when a leading end portion of the sheet-like material is within said transfer region.

7. The image-transfer device according to claim 5, wherein the second setting means includes means for selecting the second transfer voltage when a trailing end portion of the sheet-like material is within said transfer region.

8. The image-transfer device according to claim 5, further comprising means, arranged within a transporting path of the sheet-like material, for detecting the passing of the sheet-like material, wherein the second setting means includes means for determining the timing at which the first transfer voltage and the second transfer voltage are set.

9. The image-transfer device according to claim 5, wherein the first transfer voltage is a voltage level effective for transferring the image from the image-bearing member to the sheet-like material which is in contact with the image-bearing member, and the second transfer voltage is a voltage level effective for transferring the image to the sheet-like material which is not in contact with the image-bearing member.

10. The image-transfer device according to claim 2, wherein the first separation voltage has a first AC voltage and the second separation voltage has a second AC voltage having a lower absolute value than the first AC voltage.

11. An image-forming apparatus for forming a toner image on a sheet like material, comprising:

means for forming a toner image on an image-bearing member;

means for charging the sheet-like material in a predetermined polarity so that the toner image on the image-bearing member is transferred onto the sheet-like material via an electrostatic force;

means for transporting the sheet-like material through a transfer region between the charging means and the image-bearing member;

means, downstream of the charging means, for removing the electrostatic force in order to separate the sheet-like material with the toner image from the image-bearing member;

means for selectively applying one of a first separation voltage and a second separation voltage to the removing means, the second separation voltage having a lower absolute value than the first separation voltage; and means for setting the applying means to apply the first separation voltage when a part of the sheet-like material is between the removing means and the image bearing member and the trailing end portion of the sheet-like material is not within the transfer region, and setting the applying means to apply the second separation voltage when a part of the sheet-like material is between the removing means and the image-bearing member and the trailing end portion of the sheet-like material is within the transfer region, so that a transfer performance level remains good irrespective of humidity.

12. An image-forming method for forming a toner image on a sheet-like material, comprising the steps of:

forming a toner image on an image-bearing member;

transporting the sheet-like material to a transfer region adjacent the image-bearing member;

charging the sheet-like material so that the toner image on the image-bearing member is transported onto the sheet-like material via an electrostatic force;

removing the electrostatic force between the sheet-like material and the image-bearing member by a separating member in order to separate the sheet-like material with the toner image from the image-bearing member;

selectively applying one of a first separation voltage and a second separation voltage to the separating member during the removing step, the second separation voltage having a lower absolute value than the first separation voltage; and selecting the first separation voltage when a part of the sheet-like material is between the separating member and the image-bearing member and the trailing end portion of the sheet-like material is not within the transfer region, and selecting the second separation voltage when a part of the sheet-like material is between the separating member and the image-bearing member and the trailing end portion of the sheet-like material is within the transfer region, so that a transfer performance level remains good irrespective of humidity.

13. An image-transfer device for transferring an image-bearing member to a sheet-like material, comprising:

means, responsive to a transfer voltage and spacedly positioned from the image-bearing member, for charging the sheet-like material in a predetermined polarity so that the image on the image-bearing member is transferred onto the sheet-like material;

means for transporting the sheet-like material through a transfer region between the charging means and the image-bearing member, the transporting means including a guide member for guiding the sheet-like material, the guide member having a first edge portion arranged at an upstream side of the transfer region and a second edge portion arranged at a downstream side of the transfer region so as to form an opening at the transfer region and between the first end portion and the second edge portion;

means for applying a first transfer voltage and a second transfer voltage having a lower absolute value than the first transfer voltage; and means for setting the applying means to apply the first transfer voltage when the sheet-like material is guided by both the first edge portion and the second edge portion, and setting the applying means to apply the second transfer voltage when the first edge portion does not guide the sheet-like material and the second edge portion guides the sheet-like material.

\* \* \* \* \*

UNITED STATES PATENT AND TRADEMARK OFFICE
CERTIFICATE OF CORRECTION

PATENT NO. : 5,713,063
DATED : January 27, 1998
INVENTOR(S) : Michiteru OONO

It is certified that error appears in the above-identified patent and that said Letters Patent is hereby corrected as shown below:

Title page, item [56], Priority Application Data was omitted, insert --Japan 5-235172 September 21, 1993--.

Signed and Sealed this

Twenty-ninth Day of December, 1998

Attest:

BRUCE LEHMAN

*Attesting Officer*  *Commissioner of Patents and Trademarks*